US011166417B2

(12) United States Patent
Montagano

(10) Patent No.: US 11,166,417 B2
(45) Date of Patent: Nov. 9, 2021

(54) PLANT CULTIVATOR WITH LIGHT

(71) Applicant: MONDI PRODUCTS LTD., Burnaby (CA)

(72) Inventor: Michael Montagano, Burnaby (CA)

(73) Assignee: Mondi Products LTD., Burnaby (CA)

( * ) Notice: Subject to any disclaimer, the term of this patent is extended or adjusted under 35 U.S.C. 154(b) by 509 days.

(21) Appl. No.: 15/994,443

(22) Filed: May 31, 2018

(65) Prior Publication Data

US 2019/0327910 A1 Oct. 31, 2019

(30) Foreign Application Priority Data

Apr. 30, 2018 (CA) .............................. CA 3003437

(51) Int. Cl.
*A01G 9/16* (2006.01)
*A01G 9/20* (2006.01)
(Continued)

(52) U.S. Cl.
CPC ................. *A01G 9/16* (2013.01); *A01G 9/20* (2013.01); *A01G 9/18* (2013.01); *F21Y 2115/10* (2016.08)

(58) Field of Classification Search
CPC . A01G 9/16; A01G 9/20; A01G 9/249; A01G 13/0212; A01G 7/045; A01K 63/06; A01K 63/003; A01K 63/006
See application file for complete search history.

(56) References Cited

U.S. PATENT DOCUMENTS 1,939,583 A * 12/1933 Welshausen ......... A01K 63/003
261/121.1
1,974,068 A * 9/1934 Greensaft ............ A01K 63/003
119/257
(Continued)

FOREIGN PATENT DOCUMENTS

CA 2814304 A1 10/2014
CA 3003437 7/2018
(Continued)

OTHER PUBLICATIONS

Montagano, Michael; Korean Office Action for Korean Application No. 10-2018-0154573 dated Feb. 27, 2020; 15 pages.
(Continued)

*Primary Examiner* — Monica L Barlow
(74) *Attorney, Agent, or Firm* — Taylor English Duma LLP

(57) ABSTRACT

A growing device (mini-greenhouse) comprising a dome for growing crops therein and a light module operably installed on an exterior of the dome for projecting a light beam onto the crops. The dome comprises one or more openings/cutouts therein poisoned at locations that match the locations of corresponding lights of the light module such that the path of the light beam is unobstructed by the material of the dome. The light module is configured to dissipate the heat generated by the lights away from the dome, whereby the base portion of the light which includes the necessary circuitry is contained within the light module and the light beam projected in the dome is either reflected by a protruding reflector that penetrates the dome or a flat reflector that projects the light through the opening. The light module may include vents and/or fans for dissipating the heat into the atmosphere.

20 Claims, 11 Drawing Sheets

(51) Int. Cl.
*F21Y 115/10* (2016.01)
*A01G 9/18* (2006.01)

(56) References Cited

U.S. PATENT DOCUMENTS

| | | | | |
|---|---|---|---|---|
| 3,225,736 | A * | 12/1965 | Willinger | A01K 63/003 |
| | | | | 119/266 |
| 3,232,272 | A * | 2/1966 | Dosamantes De Jose | |
| | | | | A01K 63/003 |
| | | | | 119/261 |
| 3,834,351 | A * | 9/1974 | Schmidt | A01K 63/06 |
| | | | | 119/266 |
| 4,026,243 | A * | 5/1977 | Jessop, III | A01K 63/003 |
| | | | | 119/246 |
| 4,170,844 | A | 10/1979 | Steele | |
| 5,353,746 | A * | 10/1994 | Del Rosario | A01K 63/06 |
| | | | | 119/266 |
| 5,664,866 | A | 9/1997 | Reniger et al. | |
| 5,950,563 | A * | 9/1999 | Adcock, Jr. | A01K 63/003 |
| | | | | 119/246 |
| 10,237,956 | B2 * | 3/2019 | Grajcar | A01K 31/00 |
| 2001/0030865 | A1 | 10/2001 | Glowachk, Sr. et al. | |
| 2007/0058368 | A1 | 3/2007 | Partee et al. | |
| 2008/0222949 | A1 | 9/2008 | Bissonnette et al. | |
| 2009/0303706 | A1 * | 12/2009 | Atehortua | A01G 7/045 |
| | | | | 362/231 |
| 2010/0269409 | A1 | 10/2010 | Johnson | |
| 2011/0157891 | A1 | 6/2011 | Davis et al. | |
| 2011/0232190 | A1 | 9/2011 | Pindus et al. | |
| 2012/0104977 | A1 | 5/2012 | McKenzie et al. | |
| 2013/0107530 | A1 | 5/2013 | Wyrick et al. | |
| 2013/0155685 | A1 | 6/2013 | Stanley | |
| 2014/0069007 | A1 * | 3/2014 | Chen | A01G 9/249 |
| | | | | 47/66.6 |
| 2014/0123554 | A1 * | 5/2014 | Chen | A23B 7/015 |
| | | | | 47/58.1 LS |
| 2014/0251227 | A1 * | 9/2014 | Wang | A01K 63/003 |
| | | | | 119/266 |
| 2014/0305376 | A1 * | 10/2014 | Lutz | A01K 63/003 |
| | | | | 119/267 |
| 2014/0318006 | A1 | 10/2014 | Sutherland et al. | |
| 2014/0318012 | A1 * | 10/2014 | Fujiyama | A01G 31/02 |
| | | | | 47/62 R |
| 2014/0328006 | A1 * | 11/2014 | Mitlin | C01B 32/318 |
| | | | | 361/502 |
| 2015/0313090 | A1 | 11/2015 | Weiss et al. | |
| 2015/0313095 | A1 * | 11/2015 | Fenner, Jr. | A01G 9/249 |
| | | | | 47/84 |
| 2015/0319933 | A1 | 11/2015 | Li | |
| 2016/0345513 | A1 * | 12/2016 | Lo | A01G 7/045 |
| 2017/0055538 | A1 * | 3/2017 | Ohta | A23L 3/266 |
| 2017/0066587 | A1 * | 3/2017 | Fenner, Jr. | F21L 4/00 |
| 2017/0094756 | A1 | 3/2017 | Saffari | |
| 2017/0094914 | A1 * | 4/2017 | Paquette | F21V 14/006 |
| 2018/0020623 | A1 * | 1/2018 | Lin | A01G 7/045 |
| | | | | 47/58.1 LS |
| 2019/0327908 | A1 * | 10/2019 | Goettle | F21V 23/003 |
| 2019/0327911 | A1 | 10/2019 | Montagano | |
| 2020/0053854 | A1 * | 2/2020 | Xu | G02B 6/0055 |
| 2020/0063931 | A1 * | 2/2020 | Song | H05B 47/16 |

FOREIGN PATENT DOCUMENTS

| | | |
|---|---|---|
| CN | 201897098 | 7/2013 |
| CN | 203757870 | 8/2014 |
| CN | 206165261 | 5/2017 |
| EM | 1307763 | 2/1973 |
| EP | 2727458 | 7/2014 |
| JP | 03027219 | 2/1991 |
| JP | 08315626 | 11/1996 |
| JP | 1094333 | 4/1998 |
| JP | 1094334 | 4/1998 |
| JP | 11266720 | 10/1999 |
| JP | 2014113145 | 12/2015 |
| KR | 101342141 | 12/2013 |
| WO | 20110121845 | 10/2011 |
| WO | 2017047024 | 3/2017 |

OTHER PUBLICATIONS

Montagano, Michael; Japanese Office Action for Japanese Application No. 2018-227490 dated Feb. 12, 2020; 4 pages.
LUMILEDS; "LUXEON SunPlus Series Lime LEDs Produce High Yield and Nutrition in Leafy Greens", 2017, 8 pages.
Invictus MD; "Future Harvest Patents NanoDome", dated Jun. 8, 2015, 4 pages.
UK Application No. GB1819207.0; UK Search and Exam Report dated May 17, 2019; 6 pages.
Montagano, Michael; First Office Action for Chinese Application No. 201811392287.1, filed Nov. 21, 2018, dated Feb. 9, 2021, 23 pages.
Montagano, Michael; Non-Final Office Action for U.S. Appl. No. 16/181,692, filed Nov. 6, 2018, dated Sep. 27, 2021, 48 pgs.

* cited by examiner

PLANT CULTIVATOR WITH LIGHT

BACKGROUND

(a) Field

The subject matter disclosed generally relates to plant cultivators and in particular to greenhouses and/or mini-greenhouses used for cultivating leafy greens and fine herbs.

(b) Related Prior Art

Urban/indoor cultivation is becoming more and more common for those who to like to grow their own herbs and/or have continuous/immediate access to fresh vegetables and herbs. Urban cultivation may in fact be the only practical solution to the growing need for food to sustain the steady growth of human population.

If grown properly/naturally, salad crops and fine herbs can be an excellent source of nutrients including antioxidants, which help control the level of damaging free radicals in the body. The main nutrients/antioxidants contained in these crops include chlorophyll, carotenoids and anthocyanins. Carotenoids are a family of yellow and orange pigments that protect the retina against high energy radiation. Anthocyanins are red, blue and purple pigments and their dietary uptake is positively correlated with human health such as in the treatment of vision disorders and protection against neurological disorders & cardiovascular diseases etc.

The most common approach for indoor cultivation involves the use of domes (mini greenhouses) that are transparent to allow ambient light therein. Some of these conventional mini greenhouses have some sort of light module on top of the dome to shine its light through the plastic to promote plant growth especially for indoor environments. An example of such conventional domes is shown in US 2014/0318006 which uses a fluorescent light module provided in a groove/channel on an upper surface of the plastic dome in order to shine light in the dome through the transparent plastic layer constituting the dome. Many problems exist with this configuration which affect every aspect of the growing conditions needed for indoor cultivation.

A successful indoor cultivation requires an environment having the right combination of light intensity/color and temperature and humidity levels. Some crops are more sensitive than others with respect to the levels and increase/decrease of temperature, humidity, and light color and intensity. These factors affect the yield and the concentration of nutrients and antioxidants in the crops.

With respect to the light intensity and color, most conventional domes including the design shown in US 2014/0318006 tend to build up moisture/humidity on the inside of the dome which affects the intensity and the color of the light transmitted into the dome whether it is the ambient light or a light source installed on the exterior of the dome. Furthermore, the majority of materials used for building these domes is not suitable for long term use because the transparent plastic layer through which the light is emitted tends to get colored with time and becomes yellow, thus, reducing the intensity of the light transmitted into the dome. Such yellowing is accelerated when the plastic is exposed to the heat generated by the light when the light is located on the exterior of the dome.

The humidity build up and the yellowing make it impossible to efficiently customize the light spectrum (wavelength and color) emitted into the dome due to the filtering and/or altering of certain light wavelengths. This results in smaller, weaker and slowly growing crops having thin and pale leaves with consistently lower levels of chlorophyll, carotenoids and anthocyanins, which renders the crops of no use to the human body from a nutrition point of view.

Therefore, there remains a need in the market for an improved growing device that would address these problems.

SUMMARY

The present embodiments describe such growing device. In particular, the embodiments describe a growing device that allows for consistent, durable and accurate customization of the growing conditions needed for the plants being grown therein. The embodiments describe a growing device comprising a lighting system that allows for delivering customizable light spectra at consistent wavelengths and without affecting the internal temperature or humidity levels of the dome.

In a non-limiting example of implementation, the embodiments describe a growing device optionally comprising a base in the form of a tray for receiving soil or any other type of growing media therein e.g. water, and a dome adapted to fit over the base to provide an interior growing environment, the dome being shaped and dimensioned to allow crops planted in the base to grow within the dome. The dome having one or more openings/apertures/cutouts which are shaped and dimensioned to either receive a light bulb therein or to simply provide an un-obstructed passage of a beam of light generated by a light source positioned outside of the dome.

In other words, the openings can be provided so that a light bulb is partially inserted (only the diffuser part) therein, or to simply provide an obstacle free passage of a light beam projecting light from outside the dome. This ensures that the light spectra received in the dome is the same as the one projected by the light source and has the same wavelengths and characteristics (light filtration caused by moisture/humidity build up on the inside of the dome and coloration and yellowing of the plastic is eliminated). The growing device comprises a light module having one or more light sources which are shaped and dimensioned to either project light through the openings of the dome from outside the dome or to be partially received within the dome to project the light from the within the dome while keeping the heat generating components of the light source outside the dome for releasing the heat generated in the environment surrounding the growing device.

The dome may be made using a transparent or translucent material to allow light to go in, and may be made from a suitable plastic material or tempered glass. However, the dome may also have color since the light is projected therein using cutouts/openings. The tray/container may be transparent, translucent, or opaque, and may be made from a suitable plastic material, a glass material, or a metal to provide additional structural strength.

In the present document, the terms: mini-greenhouse, greenhouse, indoor cultivator, cultivator, and growing device can be used interchangeably to designate an apparatus used for growing plants therein.

Furthermore, the terms cover, douche, cultivator dome, dome, and propagation dome can be used interchangeably to designate the upper portion of the device which fits on the base/tray in some embodiments or straight on the soil in other embodiments to define the enclosed environment within which the plants grow and receive light. This portion is usually made of a transparent material for allowing ambient light therein.

It should be noted that the term "dome" is the term known in the art for such covers and that this term is not limited to circular shapes (as the geometrical definition may imply). As used in the art, and as intended in the present document, the term "dome" has a base which may be rectangular, square, triangular, circular, oval, or any other regular or irregular geometrical shape.

According to one aspect, there is provided a cultivator for growing crops, comprising: a dome shaped and dimensioned to create a closed environment for growing crops therein; and a light module for projecting a light beam onto the crops, the light module comprising one or more lights provided at given locations, each light having a reflector portion through which a light beam is projected and a base portion including electric circuity for producing electric current at desired voltage and intensity. The light module may define an enclosure enclosing at least a base part of the lights; and the dome may comprise one or more cutouts positioned to match the locations of the lights on the light module. The light module may be installed on an exterior wall of the dome to allow the lights to project their lights beams inside the dome through the cutouts, while dissipating a heat generated by the base of the lights into the atmosphere away from the dome.

In an embodiment, the reflector portion of the light defines a volume that protrudes from a flat surface of the light module and penetrates at least partially into an interior of the dome through a corresponding cutout of the dome while the base portion of the light remains within in the light module outside of the dome.

In another embodiment, the reflector portion of the light is substantially flat and projects its light beam through a corresponding cutout of the dome while remaining entirely contained within the light module outside of the dome.

The light module may comprise a plurality of vents for releasing the heat generated by the base portion of the lights into the atmosphere.

The light module may also comprise one or more fans for circulating ambient air within the light module to dissipate the heat generated by the base portion of the lights into the atmosphere.

In an embodiment, the light module comprises a heat insulating layer provided onto a surface of the light module that contacts the dome for preventing an exchange of heat between an interior of the light module and the dome.

In another embodiment, the one or more lights are LED lights having customizable light spectra.

The dome may comprise one or more walls, and the light module defines an LED array and occupies a portion or an entirety of at least one of the walls.

The cultivator may further comprise a tray for receiving one or more of soil, water, crop seed and crop roots therein, the tray having an upper edge which is shaped and dimensioned to match with a lower edge of the dome for creating the closed environment.

The cultivator may also comprise a sensor module for measuring one or more of temperature, humidity, light spectrum intensity, $CO_2$, and soil moisture levels of the closed environment inside the dome and/or a vent configured to open or close for exchanging heat and humidity with the atmosphere.

A control unit may be provided which is configured to receive a user input and customize a light spectrum of one or more of the lights in response to the user input. The control unit may be in operable communication with one or more electric fans to activate/deactivate the fans to ventilate the dome and/or an interior of the light module to dissipate the heat to the atmosphere.

In another aspect, there is provided a kit for building a cultivator, the kit comprising: a dome shaped and dimensioned to create a closed environment for growing crops therein; and a light module for installing onto the dome for projecting a light beam onto the crops. The light module comprises one or more lights provided at given locations, each light having a reflector portion through which a light beam is projected and a base portion including electric circuity for producing electric current at desired voltage and intensity. The light module defines an enclosure enclosing at least a base part of the lights; and wherein the dome comprises one or more cutouts positioned to match the locations of the lights on the light module. The light module being for installing on an exterior wall of the dome to allow the lights to project their light beams inside the dome through the cutouts, while dissipating a heat generated by the base of the lights into the atmosphere away from the dome.

In another aspect of the invention there is provided a cultivator for growing crops, comprising: a dome shaped and dimensioned to create a closed environment for growing crops therein, and having a plurality of cutouts therein; and a light module for projecting a light beam onto the crops, the light module comprising one or more lights provided at given locations that match locations of the cutouts in the dome. The light module may be installed on an exterior of the dome to allow the lights to project their light beams inside the dome through the cutouts, while dissipating a heat generated by the lights into the atmosphere away from the dome.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The present embodiments describe a growing device (mini-greenhouse) comprising a dome for growing crops therein and a light module operably installed on an exterior of the dome for projecting a light beam onto the crops. The dome comprises one or more openings/cutouts therein positioned at locations that match the locations of corresponding lights of the light module such that the path of the light beam is unobstructed by the material of the dome. The light module is configured to dissipate the heat generated by the lights away from the dome, whereby the base portion of the light which includes the necessary circuitry is contained within the light module and the light beam projected in the dome is either reflected by a protruding reflector that penetrates the dome or a flat reflector that projects the light through the opening. The light module may include vents and/or fans (air filters) for dissipating the heat into the atmosphere.

The present invention will be more readily understood by referring to the following examples which are given to illustrate the invention rather than to limit its scope.

Figure 1A:
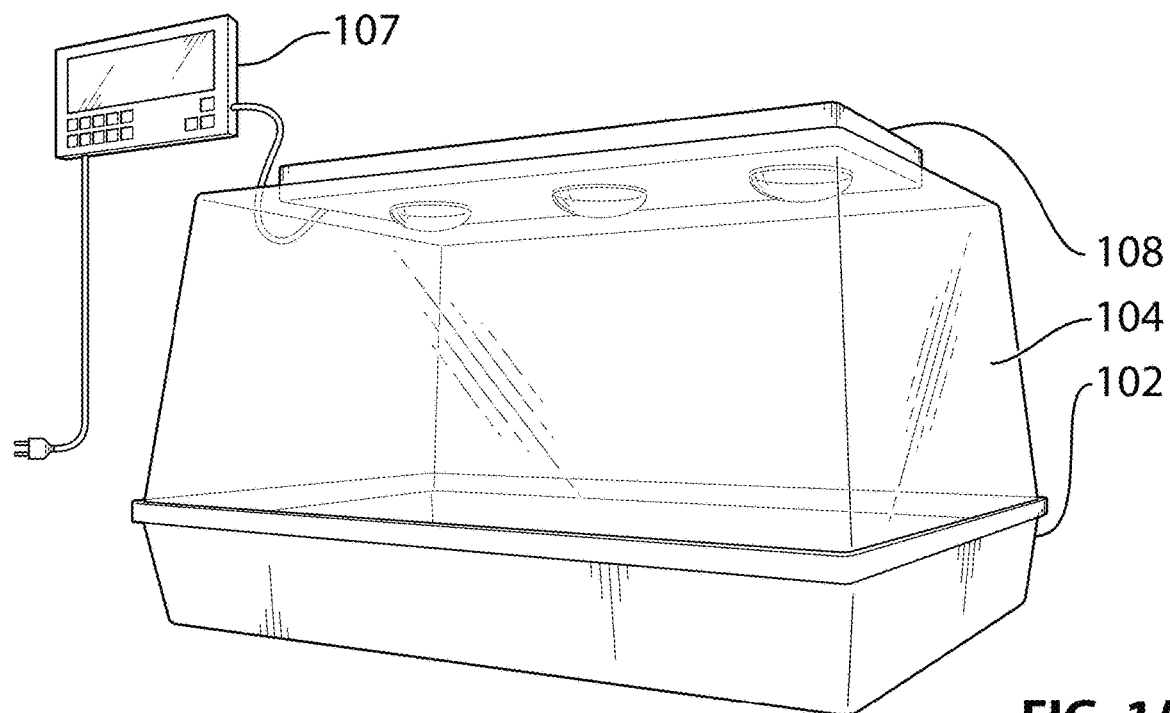
FIG. 1A illustrates an exemplary embodiment of a growing device in accordance with an embodiment.
Figure 1B:
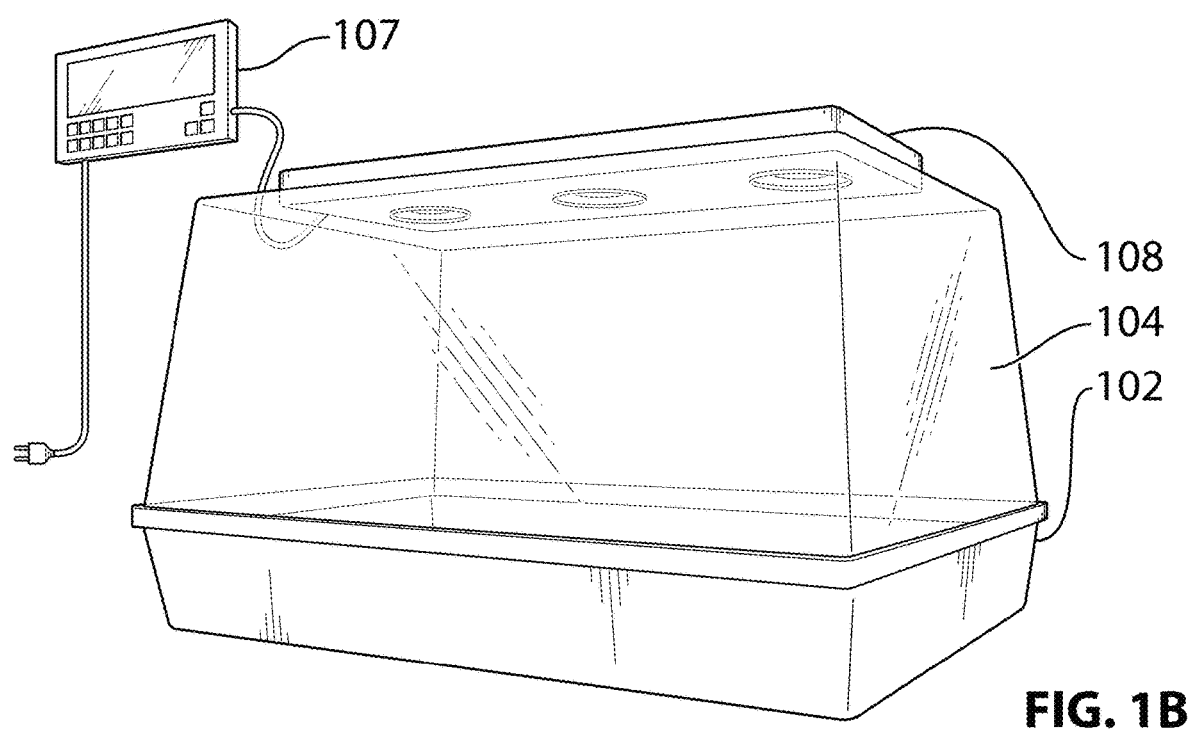
FIG. 1B illustrates an exemplary embodiment of a growing device in accordance with another embodiment.
Figure 2:
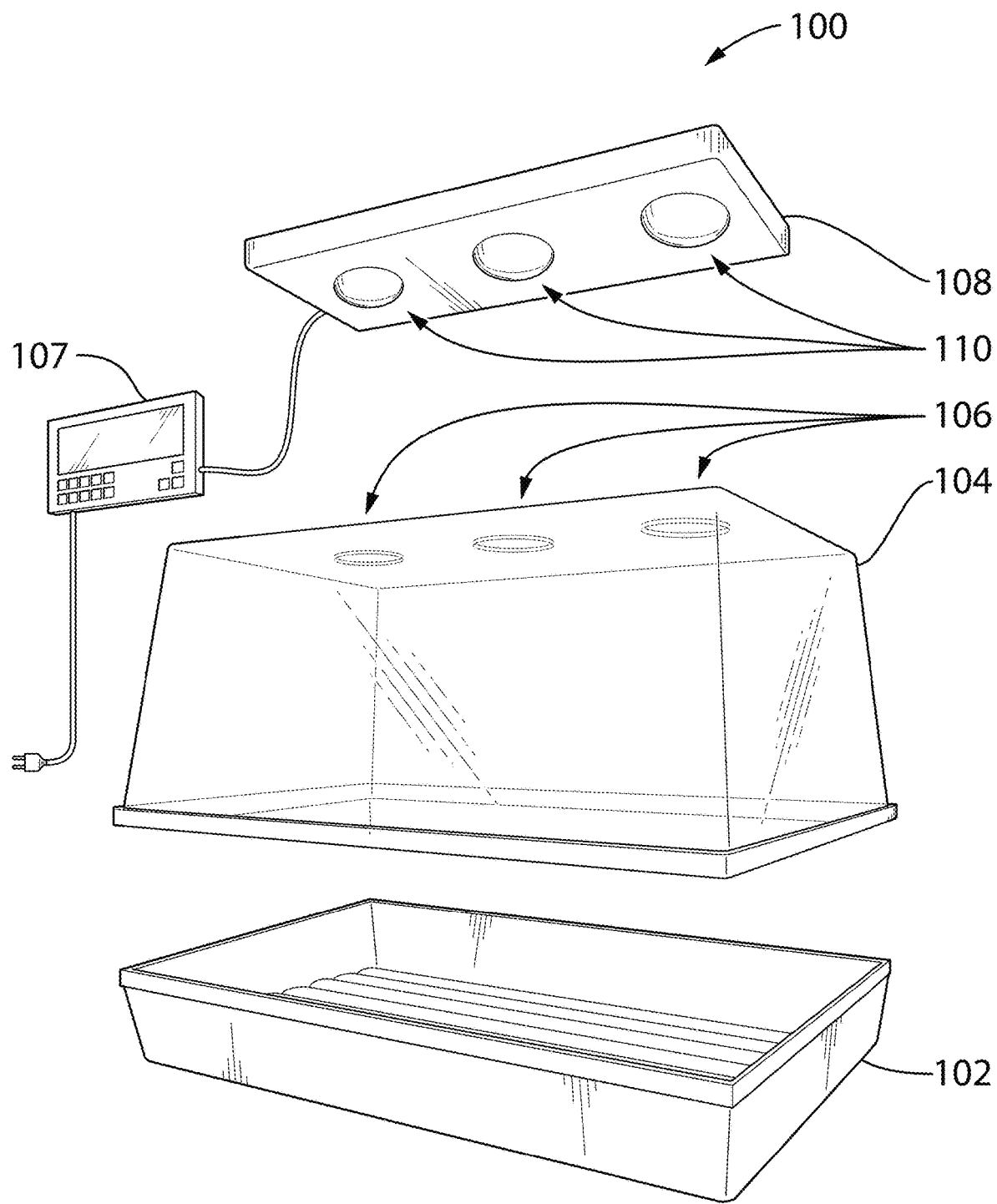
FIG. 2 illustrates an exploded view of the growing device of FIG. 1A.

Referring to the drawings, and more particularly to FIGS. 1A & 1B, there is described an exemplary embodiment of a growing device 100 in accordance with an embodiment. FIG. 2 illustrates an exploded view of the growing device of FIG. 1A. As shown in FIGS. 1A-2, the growing device 100 comprises a base 102 in the form of a container/tray for receiving soil and planting seeds/crops/cuttings therein, and a dome 104 which is shaped and dimensioned to match (receive or be received) with the base 102, whereby one would releasably receive the other to create a closed environment for growing crops. A lighting module 108 is provided for lighting the dome 104 using one or more lights 110. The dome 104 comprises one or more apertures/openings/cutouts 106 in one or more of its walls. The openings 106 are shaped and dimensioned to match the shape of the lights 110 such that the light beams emitted by the light 110 get projected in the dome through or from the openings 106 without being obstructed by the plastic or whatever material the dome 104 is made of.

The lights 110 are preferably LED lights having low to no heat at the diffuser (in a non-limiting example of implementation). LEDs are rapidly becoming the light source of choice for indoor horticultural applications due to their superior lifetimes, greater energy efficiency, their low maintenance, and most importantly the ability to customize their light spectra to meet the growth and nutritional needs of the plant of interest. Unlike standard tungsten bulbs and fluorescent bulbs the diffuser portion of an LED bulb (glass portion through which light is emitted) is cool to touch because LEDs generally do not produce heat in the form of infrared (IR) radiation unless of course they are IR LEDs.

However, crucial amounts of heat are produced within the LED device itself e.g. Ballast/Driver/Heat sink, (the base portion of the LED), due to the inefficiency of the semiconductor processes that generate light. For example, the wall-plug efficiency of LED packages is typically in the region of 5-40%, meaning that somewhere between 60 and 95% of the input power is lost as heat. For example, the energy consumed by a 100-watt GLS/GJL incandescent bulb produces around 12% heat, 83% IR and only 5% visible light. In contrast, a typical LED might produce 15% visible light and 85% heat. It is essential to remove this heat through efficient thermal management to prevent the internal (junction) temperature of the LED from rising, which causes the LED characteristics to change. If the junction temperature of an LED is increased, both the forward voltage and the lumen output decrease. The output wavelength also shifts with a change in junction temperature, thus, changing the color and intensity of the light. LED lamps typically include heat dissipation elements such as heat sinks and cooling fins and very high power lamps for industrial uses are frequently equipped with cooling fans. These elements are provided in the base section of the LED bulb underneath the LED array and the diffuser. The embodiments are aimed at reducing the effect/transfer of this heat onto the closed growing environment inside the growing device.

Figure 3A:
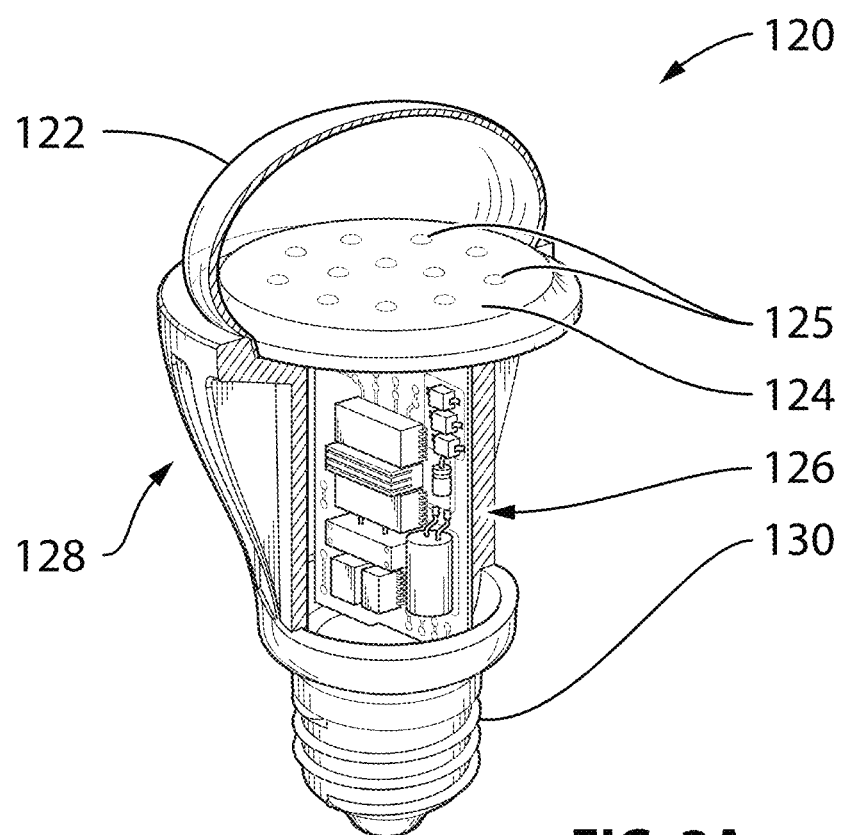
FIG. 3A illustrates a cross sectional view along the Y axis of a conventional LED lamp having a dome shaped diffuser.
Figure 3B:
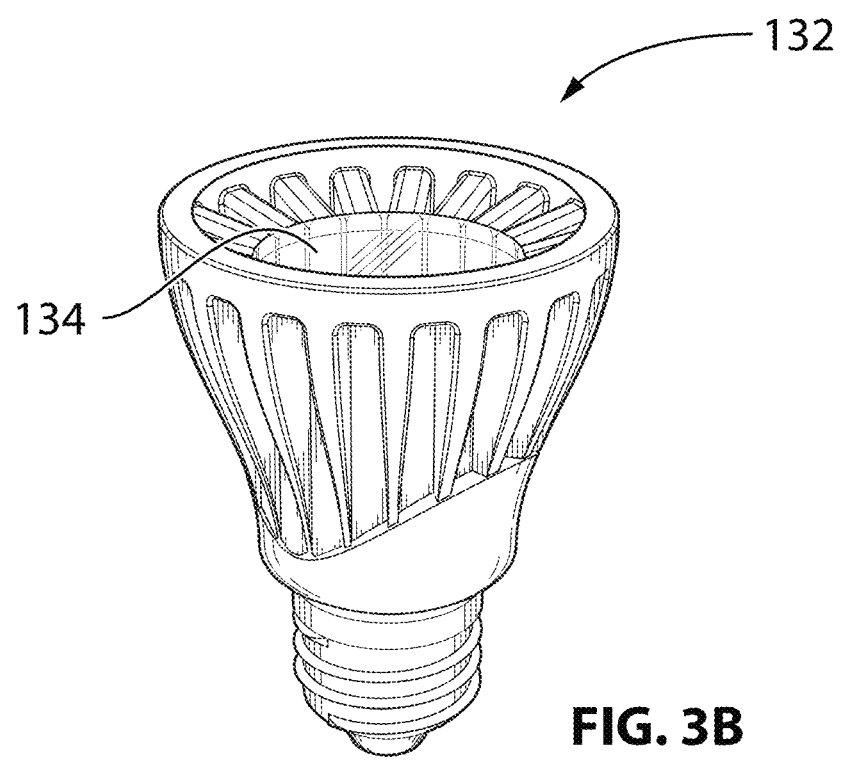
FIG. 3B illustrates another example of a conventional LED lamp having similar characteristics and components to lamp shown in FIG. 3A with the exception of a flat diffuser.

FIG. 3A illustrates a cross sectional view along the Y axis of a typical LED lamp having a dome shaped diffuser. As shown in FIG. 3A, a typical LED bulb 120 comprises a diffuser 122 usually made of fully or partially transparent glass, an LED array 124 comprising a plurality of LED chips 125 for generating the light beam emitted through the diffuser. The LED array 124 may be configured to generate light beams with customizable light spectra. Also included in the LED 120 is a driver circuitry 126 which includes a set of transistors, capacitors, rectifiers and other active electronic components as desired. These components generate substantial amounts of heat which is dissipated into the atmosphere using internal and external heat sinks/fins 128. Otherwise, high temperatures can cause premature failure and reduced light output. In the example shown in FIG. 3A the LED shown includes an E27 screw-in base 130 for receiving electric current from a designated socket. FIG. 3B illustrates another example of a typical LED lamp 132 having similar characteristics and components with the exception of a flat diffuser 134.

In the present embodiments, the growing device is designed so that the heat generated by the lights 110 gets dissipated outside the dome 104 and into in the atmosphere outside of the enclosed growing environment of the growing device. In one embodiment the light module 108 is designed so that the lights 110 can project their light beams through the openings 106 of the dome 104 from outside the dome 104. In another embodiment, the light module 108 is designed so that the lights 110 are only partially received within the dome to project the light from within the dome while keeping the heat generating components (which are usually provided in the base) of the lights outside the dome 104.

In both embodiments, the heat generated by the base 126 of the LED bulb remains outside the dome to not increase the temperature of the growing device 100 beyond the desired levels mainly for indoor purposes. When indoor, one or more growing devices 100 are provided in an enclosed room and the temperature is regulated for the entire room since the provision of heating and cooling apparatuses in the growing device is complicated and would increase the cost of the growing device beyond the purchase capacity of the users.

Figure 4A:
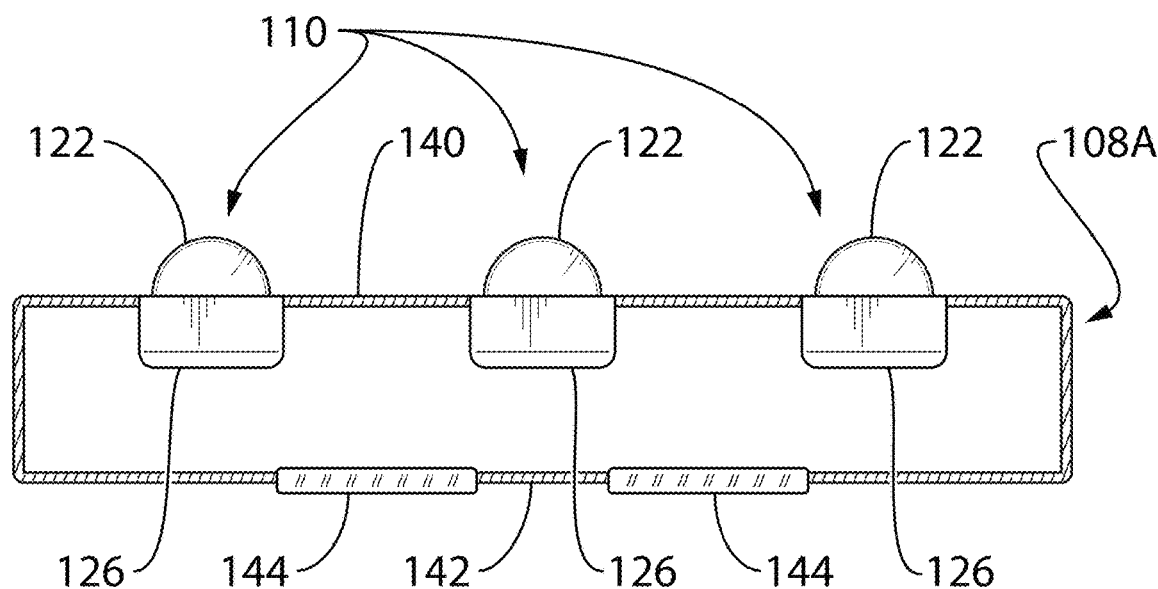
FIG. 4A is a cross sectional view of a non-limiting example of a light module 108A, in accordance with an embodiment.
Figure 4B:
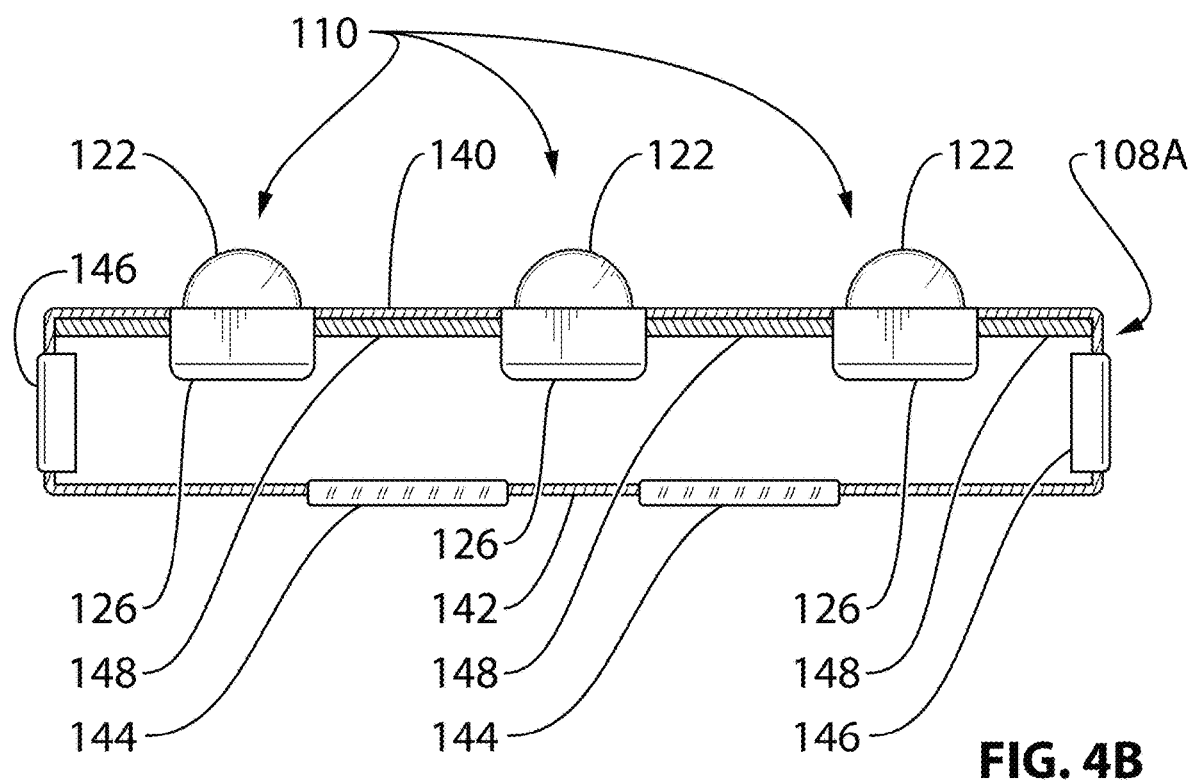
FIG. 4B is a cross sectional view of another embodiment of the light module of FIG. 4A.

FIG. 4A is a cross sectional view of a non-limiting example of a light module 108A, in accordance with an embodiment, and FIG. 4B is a cross sectional view of another embodiment of the light module of FIG. 4A. In an embodiment, the light module 108A defines an enclosure comprising a first surface 140 which, during operation of the growing device, comes in contact with the wall of dome 104 having the openings 106 to project the light beam through the openings 106. The enclosure also comprises a second surface 142 opposite the first surface 140.

In the present example, the light module 108A is designed to have protruding diffusers 122 (such as the diffusers 122 shown in FIG. 3A). In the present embodiment, the light module may be designed so that only the diffuser 122 of the LED protrudes past the surface 110, whereas the base 126 remains within the light module 108 to diffuse the heat generated by the drive circuitry of the LED bulb within the module 108A. One or more vents 144 may be provided in the enclosure to diffuse the heat into the atmosphere. Accordingly, during operation of the growing device 100, when the light module 108A is installed onto the dome 104 only the diffuser 122 (which is the cold portion of the LED bulb) protrudes through the corresponding opening 106 to project the light within the beam while the heat gets dissipated into the enclosure and then into the atmosphere.

In an embodiment, a heat insulating layer 148 may be provided onto the first surface 140 as exemplified in FIG. 4B. The insulating layer 148 may be provided on the inside of the enclosure (or the outside thereof) to prevent the heat contained in the enclosure from being transferred to the dome. One or more fans 146 may also be provided within the light module to accelerate the heat dissipation process as shown in FIG. 4B.

Figure 5A:
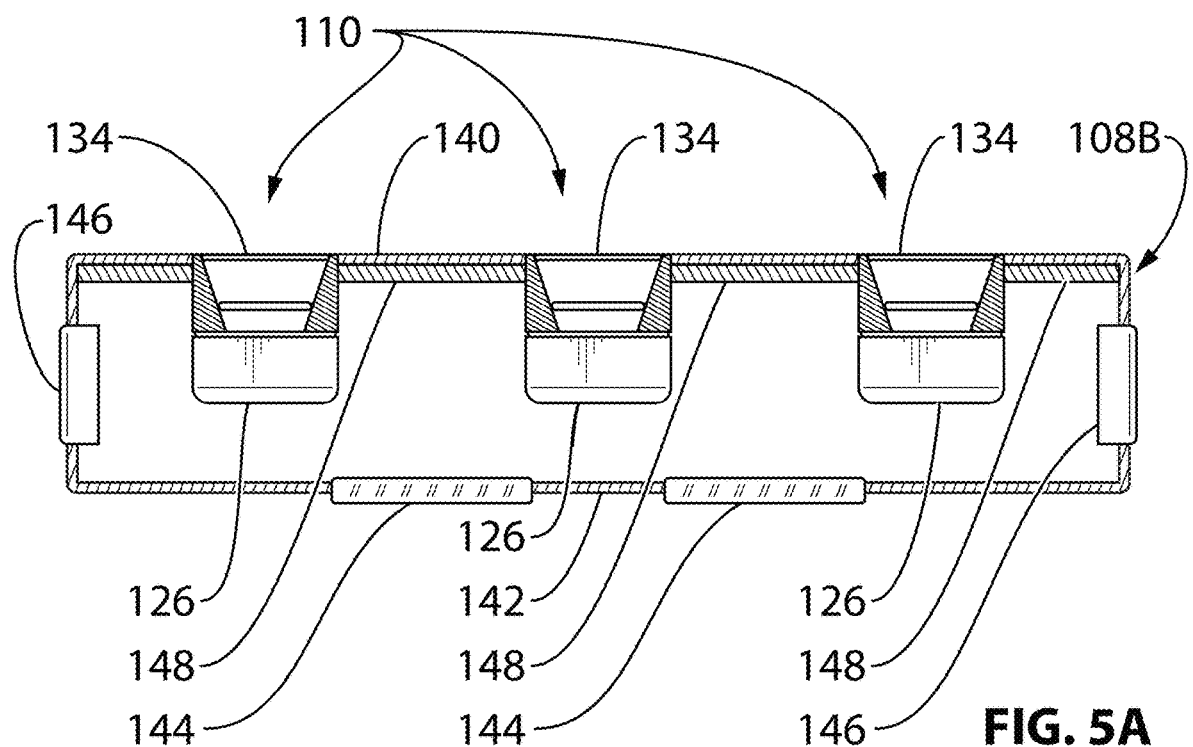
FIG. 5A is a cross sectional view of another non-limiting example of a light module, in accordance with another embodiment.

FIG. 5A is a cross sectional view of another non-limiting example of a light module 108B, in accordance with another embodiment. It should be noted that like reference numerals designate the same elements. As shown in FIG. 5A, a light module is illustrated which does not have protruding diffusers that would penetrate the dome to shine the light beam from within. By contrast, the lights 110 used in the present module include flat diffusers 134 such as those shown in the example of FIG. 3B, whereby when the light module 108B is installed onto the wall of a dome 104, the light beam is generated and emitted from the exterior of the dome and projected into the dome through the openings 106 while the heat generated by the base 126 is dissipated within the enclosure and then into the atmosphere as discussed above in the embodiments of FIGS. 4A and 4B.

Figure 5B:
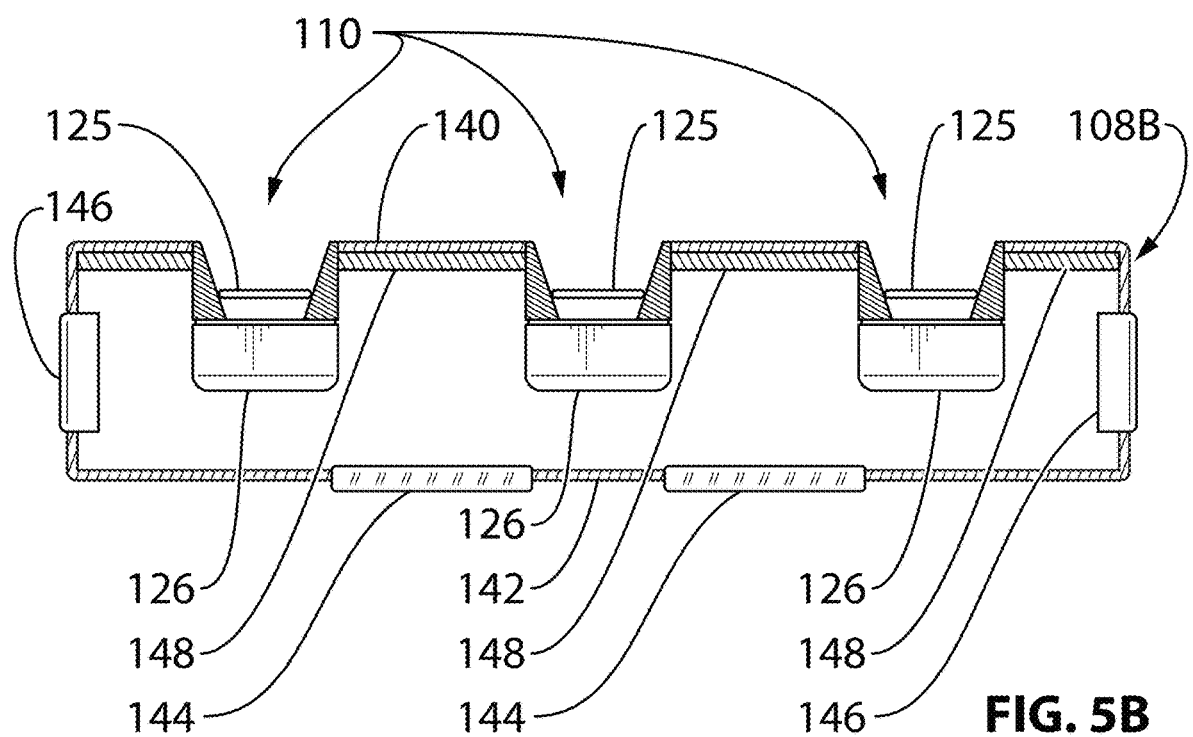
FIG. 5B illustrates a variation of FIG. 5A, wherein the light module does not include diffusers.

FIG. 5B illustrates a variation of FIG. 5A, wherein the light module 108B does not include diffusers. In this embodiment, the LED array 124 or one or more LED chips 125 generate the light beams and project them immediately through the openings 106.

Figure 6:
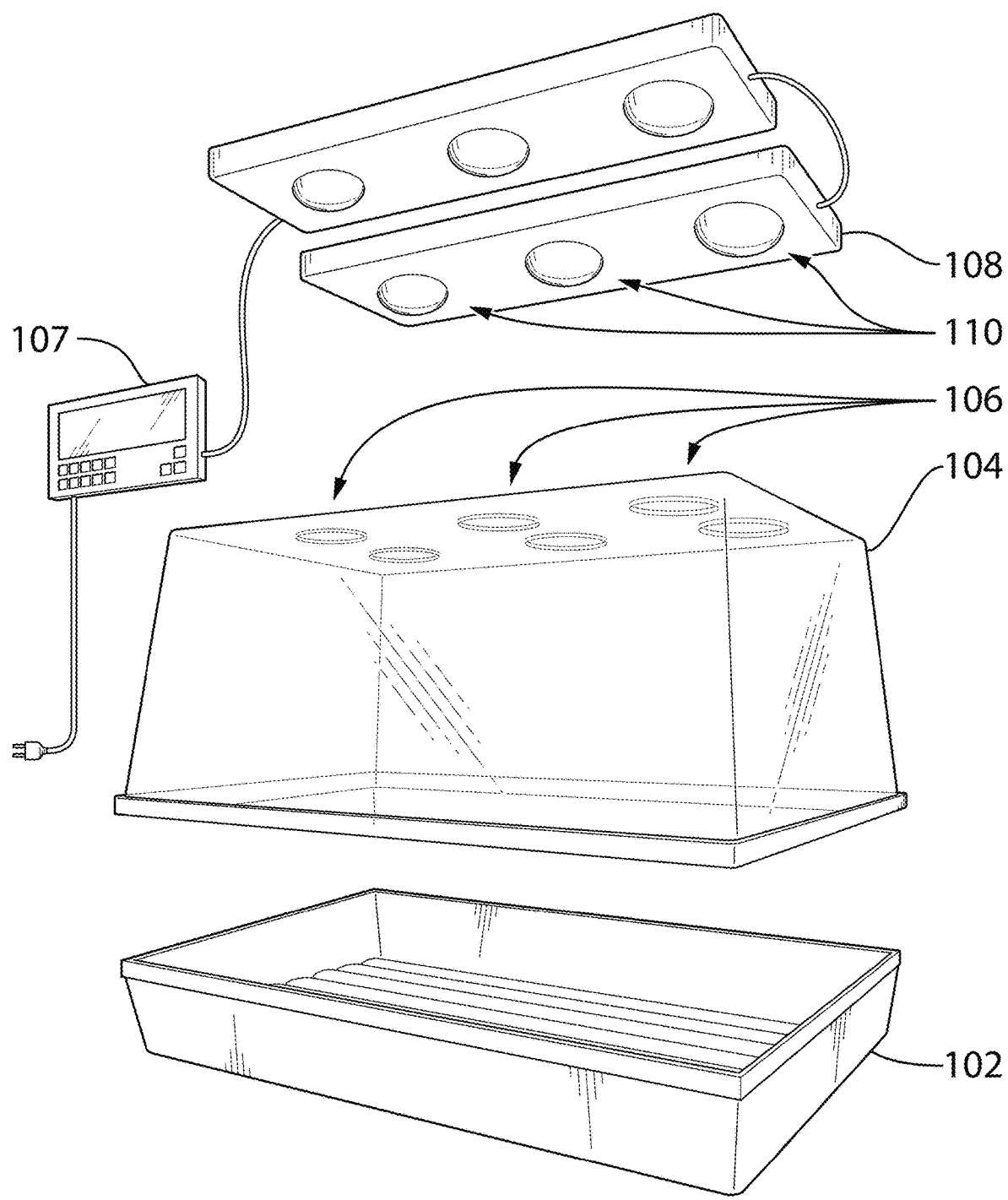
FIG. 6 illustrates another example of a growing device comprising more than one light enclosures.

It should be noted that the embodiments are not limited to any shape or dimension for the openings 106 provided in the dome 104 nor the shape of the matching lights 110 of the light module 108. In a non-limiting example, the shape of openings and/or the light can be square, triangle, rectangle, oval etc. Furthermore, the embodiments are not limited to any number of openings. Moreover, the light module could include a single enclosure as shown in FIGS. 1 & 2 or more than one enclosure as exemplified in FIGS. 6, 7A-8B. The growing device exemplified in FIG. 6, comprises two sets of openings, and the matching light module comprises two enclosures which may be connected to each other as shown in the figure.

Figure 7A:
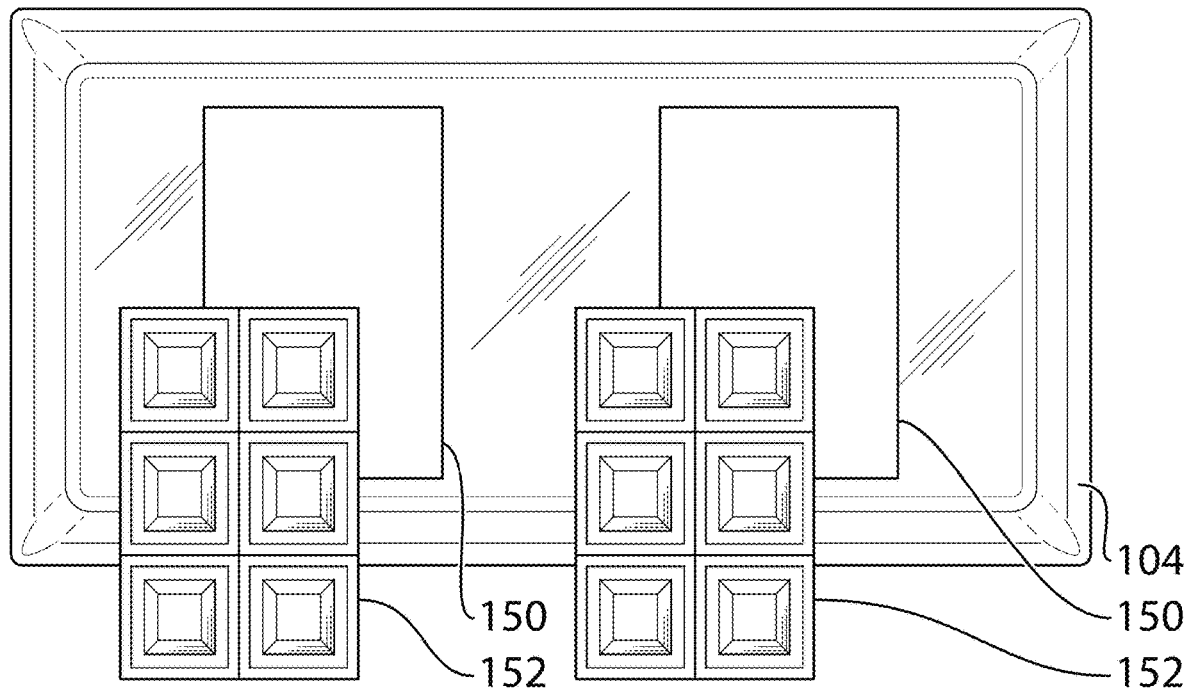
FIGS. 7A &7B illustrates another example of a growing device including large cutouts for receiving light arrays or flat Light bulbs.
Figure 7B:
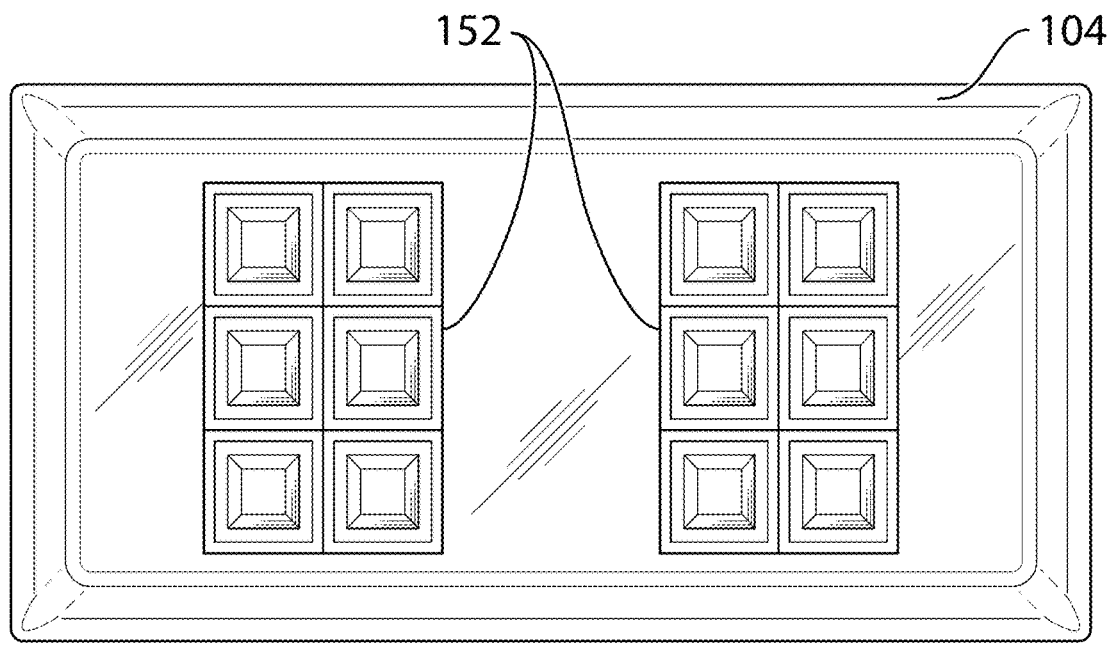
Figure 8A:
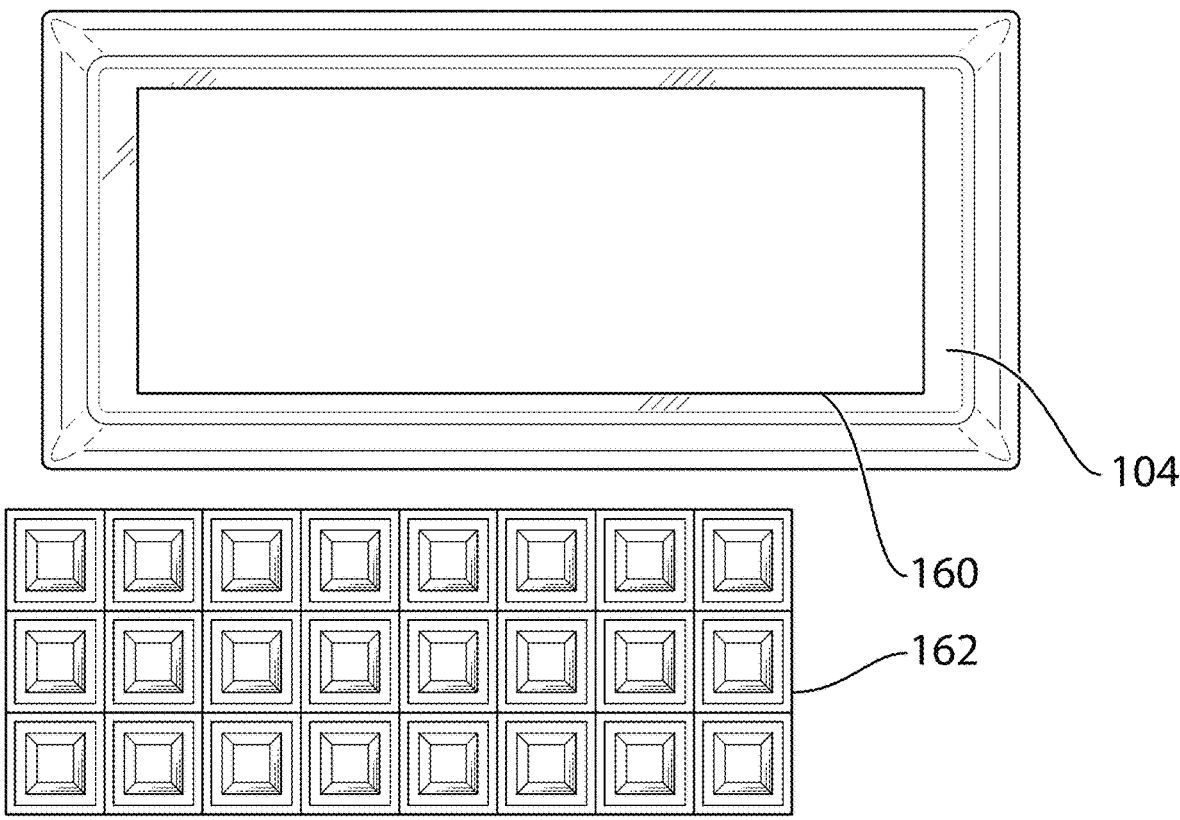
FIGS. 8A & 8B illustrates another example of a growing device including a cutout that takes the entirety of the associated wall (top panel) to receive a large light array.
Figure 8B:
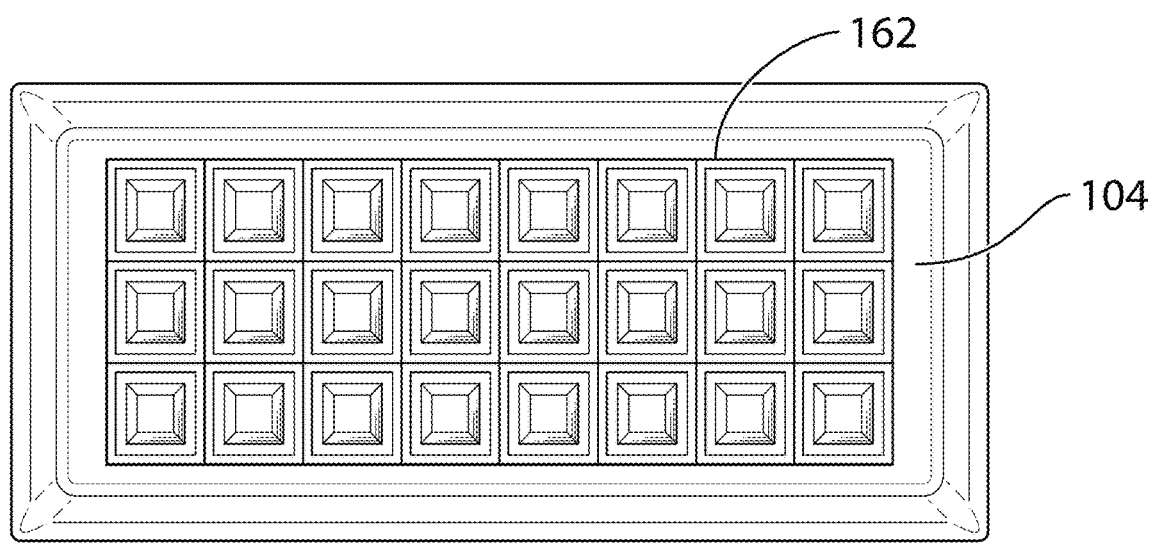

Other configurations are also shown in FIGS. 7A & 7B and in FIGS. 8A & 8B. In the embodiment of FIGS. 7A & 7B one or more large cutouts 150 are provided in a wall of the dome 104 for receiving light arrays (or flat light bulbs) 152 as exemplified in FIGS. 7A & 7B. In the example of FIGS. 8A & 8B, a large cutout 160 is provided in the dome 104 which takes the entirety or almost the entirety of that wall of the dome to receive a large array 162 as shown in FIG. 8B. In yet another configuration, the light module may include a flexible LED sheet that would wrap around/cover a portion or the entirety of the dome. Cutouts matching the positions of the lights may be provided in the dome for providing an obstacle-free light passage for the light beam to penetrate the dome.

While the figures show the light module to be provided on the ceiling portion (upper wall) of the dome 104, it should be noted that the embodiments are not limited to this configuration. One or more light modules may be mounted/installed on any side wall of the dome without departing from the scope of the claims.

Figure 9A:
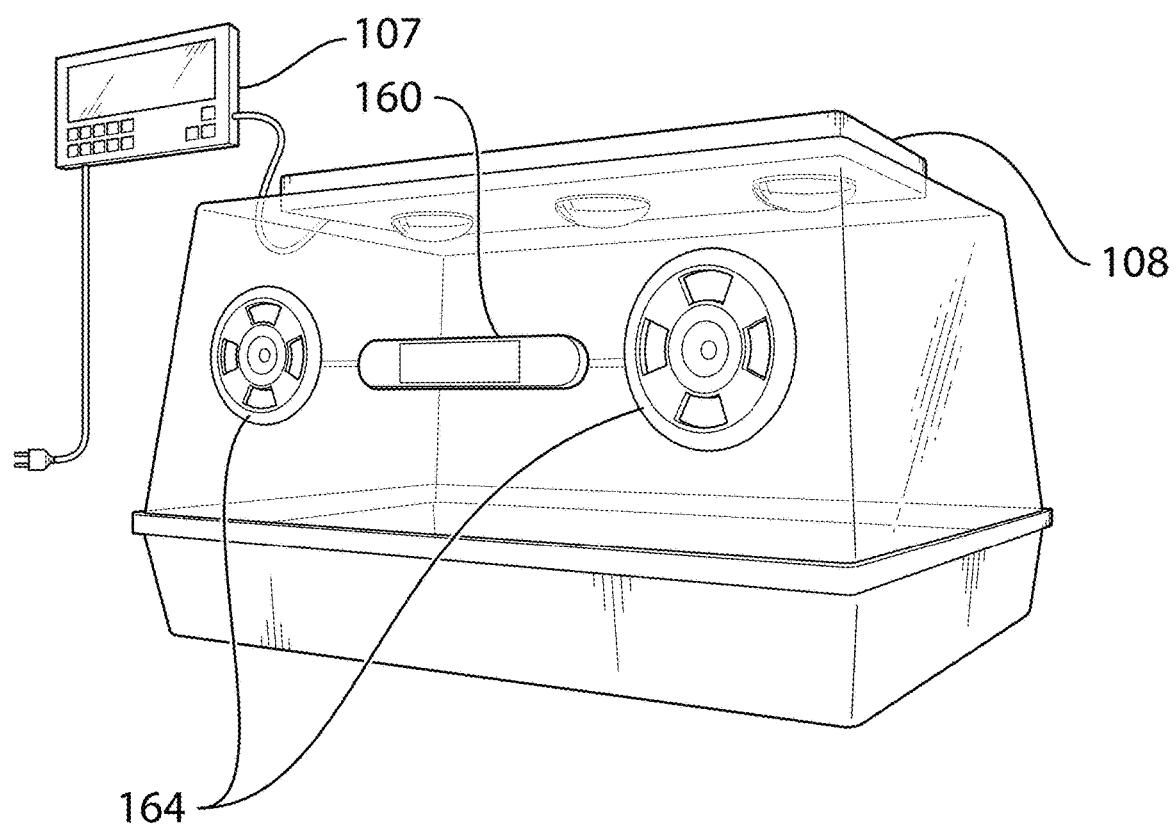
FIGS. 9A & 9B illustrate an exemplary embodiment of a growing device including vents and/or a thermo-hygrometer, in accordance with another embodiment.
Figure 9B:
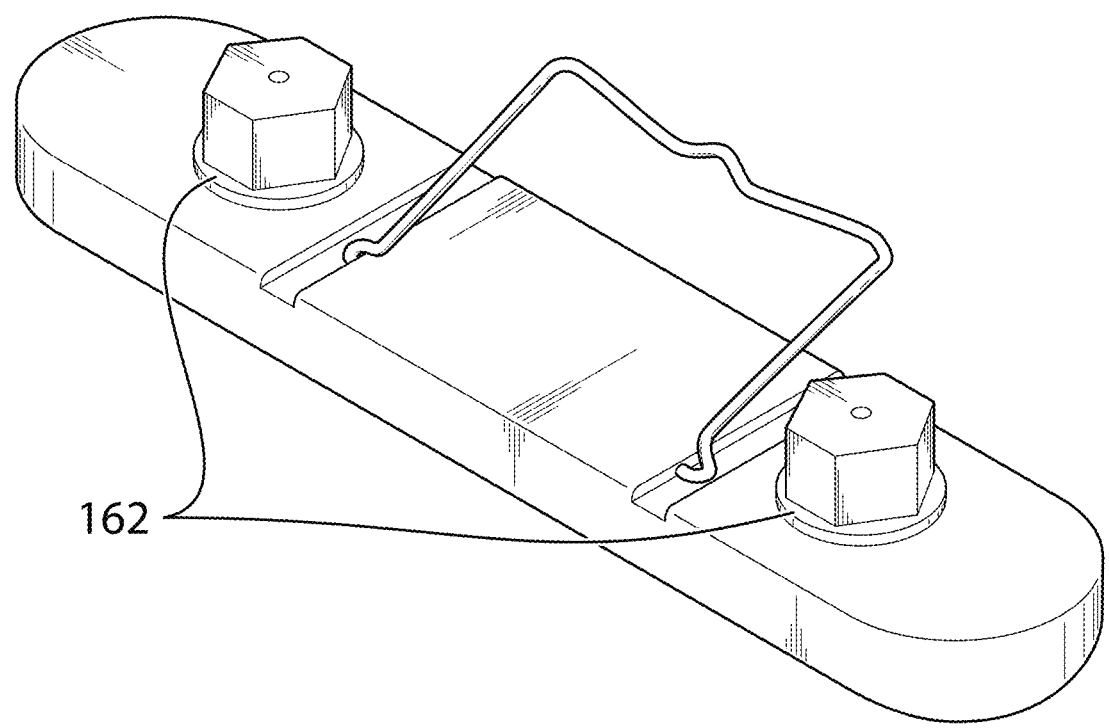

In an embodiment, the growing device may include a sensor module 160 for measuring one or more of: temperature, humidity, light spectrum intensity, $CO_2$, soil moisture levels etc. of the interior environment of the dome 104. In an embodiment, the sensor module 160 may include protruding members 162 designed to penetrate the dome 104 via openings provided in the wall of the dome to have access to the interior environment of the dome 104 to sense these parameters while the sensor module 160 remains on the outside of the dome 104 as exemplified in FIGS. 9a and 9b.

In an embodiment, the growing device 100 may include (preferably in one or more walls of the dome 104) one or more vents 164 (the vents 164 may be electric fans designed to accelerate air circulation in and out of the dome) which can be opened and closed for exchanging (releasing or receiving) heat and/or humidity with the atmosphere as desired (e.g. depending on the temperature and humidity levels detected by the sensor module 160). In an embodiment, the vents 164 may be electric and may include an electric motor/actuator to open and close them as desired. The vents 164 may be configured to be in wired and/or wireless communication with the control unit or the light module or the sensor module to automatically open or close the vents (or turn on and off the fan included in those vents) as desired.

A control unit 107 may be provided, which may be operably connected to the light module 108 (or integrated/embedded therein in the same enclosure) for allowing the user to customize the light spectrum of the LED lights (or sub-groups thereof) for selecting and/or combining different light intensities/light colors etc. (e.g. blue, red, green, blue and red, UV for curing plant diseases and pests, etc.). The control unit 107 may include pre-programmed intelligence intended to assist the user to select the appropriate light color and intensity etc. depending on the growth period of the crops and the type of plants being grown in the dome (or the health and condition of the plant and the soil to determine if UV is needed etc.). For example, the control unit 107 may include an interface (touch interface and/or keyboard) and/or a display screen which allows the user to reset/activate a certain timer to indicate the beginning of certain growing stage, and/or select the type of crops/plants/seeds being grown, whereby, the control unit may generate alerts (visual/audible and/or messaging alerts (e g email or text) over Wi-Fi or the like) for alerting the user to perform a certain change, or may be configured to automatically perform such a change (change of color including adding or removing certain wavelengths etc.).

In a non-limiting example, the control unit may be in operable communication (using a wired or wireless connection e.g. Bluetooth or Wi-Fi) with the sensor module 160 and/or the vents 160 and may be configured to automatically control operation of the vents 164 to open them or close them as desired e.g. by comparing the humidity and temperature levels on the inside of the dome to those on the outside of the dome (e.g. using another sensor module (embedded in the control unit 107 or external to it) to determine whether the opening of the vent would cause a decrease in humidity/temperature (if the internal humidity/temperature is high). The control unit may be a standalone unit as shown in FIGS. 1A & 1B and may also be embedded in the light module as exemplified in FIGS. 10A & 10B.

Figure 10A:
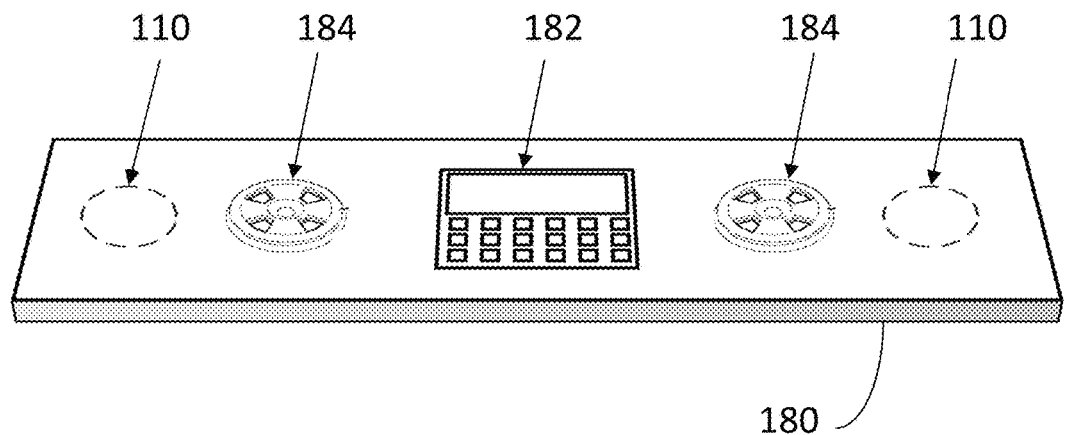
FIG. 10A is a side elevational view of a light module, in accordance with another embodiment.
Figure 10B:
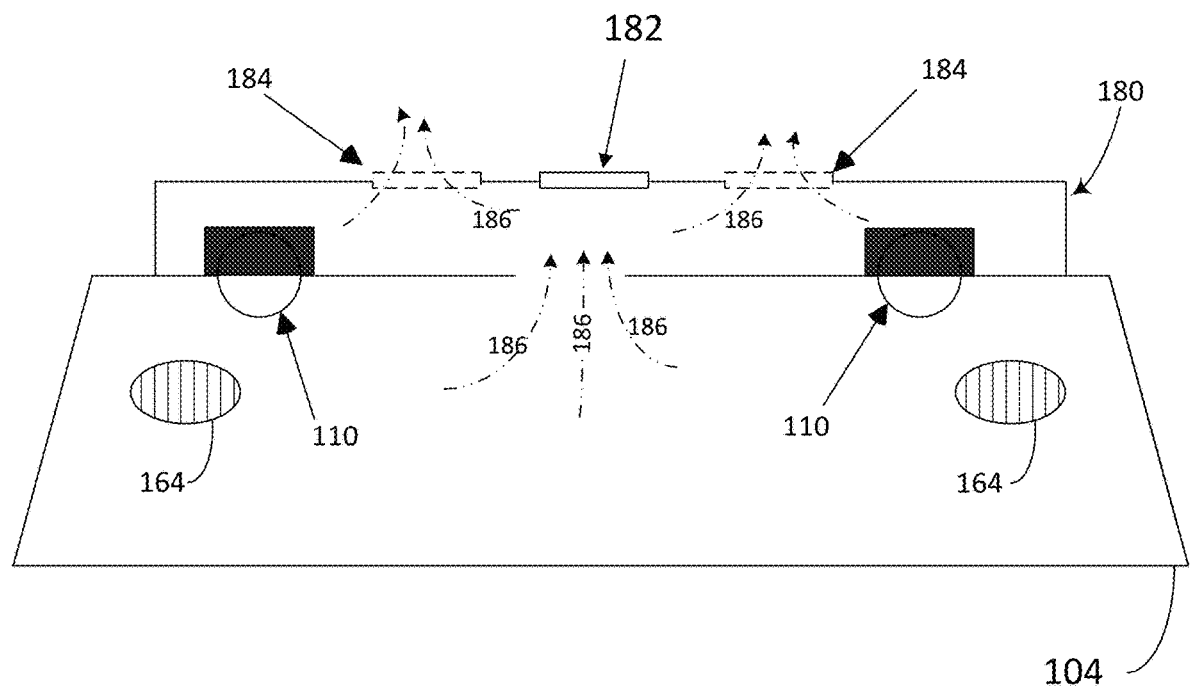
FIG. 10B is a cross sectional view of a growing device using the light module of FIG. 10A, in accordance with an embodiment.

FIG. 10A is a side elevational view of a light module, in accordance with another embodiment, and FIG. 10B is a side view of a growing device using the light module of FIG. 10A. The example of FIG. 10A shows the opposite side of where the lights 110 are provided on the light module. As exemplified in FIG. 10A, a light module 180 is provided which includes a control module (similar in function to the control module 107 shown in the other embodiments) embedded therein rather than being provided as a separate unit as in the other embodiments. The light module 180 may include one or more fans 184. The fans 184 may be automatically controlled by the control module and may be configured to operate simultaneously and in opposite directions whereby one fan 184 would push ambient air in and the other would push inside air out to accelerate the ventilation process of the dome. In other embodiments, both fans 184 may operate in the same direction to accelerate ventilation through the vents 164 provided in the dome.

It should be noted that the fans 184 are configured to access and ventilate the interior of the dome. In one embodiment, the fans 184 may be used with the fans 146 (shown in FIG. 4B) which are intended to cool the interior of the light module 108. In another embodiment, the fans 184 may be configured to replace the fans 146 whereby the fans 184 may be configured to pull the air from the interior of the dome 104 through the interior of the light module and to the atmosphere in order to ventilate both the interior of the dome and the interior of the light module as exemplified in FIG. 10B. The intake of air from the atmosphere into the dome can occur through the vents 164.

In a further embodiment, a heat mat may be provided for warming the growing media (soil, water etc.) in the tray/base for an optimal growing environment. The heat mat may be embedded within the tray/base as a single unit or may be provided as a separate unit. Temperature sensors may be provided to sense the temperature of the growing media in order to activate/deactivate the heat mat when needed. In a further embodiment, activation and deactivation of the heat mat may be performed through the control unit. Heat sensors maybe in operable communication with the control unit which can control the temperature of the growing media in accordance with the type of the plants and the growing phase etc.

Although a tray/base is being described as being part of the growing device, in a preferred embodiment, it should be noted that the growing device can simply be provided/positioned on top of the soil (indoor or outdoor) directly to create a growing environment. Such growing device may be provided directly on the soil indoor and/or outdoor in an area that lacks direct sunshine or light in general. The lower edges of the dome may be configured to a have a thicker edge and/or a tapered edge that allows to insert the edge in the soil by pressing the dome downward without bending/breaking/collapsing the edge of the side/top panels forming the dome.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A cultivator for growing crops, comprising:
a tray;
a dome configured to join with the tray, the joined dome and the tray shaped and dimensioned to create an enclosed environment for growing crops therein; and
a light module for projecting a light beam onto the crops, the light module comprising one or more lights provided at given locations, each light having
a reflector portion through which a light beam is projected, the reflector portion exhibiting low to no heat; and
a base portion including electric circuitry for producing electric current at desired voltage and intensity, the electric circuitry in the base portion producing heat during operation;
wherein the light module defines an enclosure enclosing at least the base portion of the lights; and
wherein the dome comprises one or more cutouts therethrough positioned to match the locations of the lights on the light module; and
wherein the light module is installed on an exterior wall of the dome to allow the light reflectors to be in direct contact with the enclosed environment to un-obstructively project their light beams inside the dome through the cutouts, while keeping the base portion within the enclosure of the light module for dissipating the heat generated by the base portion of the lights into the atmosphere away from the dome.

2. The cultivator of claim 1, wherein the reflector portion of the light defines a volume that protrudes from a flat surface of the light module and penetrates at least partially into an interior of the dome through a corresponding cutout of the dome while the base portion of the light remains within the light module outside of the dome.

3. The cultivator of claim 1, wherein the reflector portion of the light is substantially flat and projects its light beam through a corresponding cutout of the dome while remaining entirely contained within the light module outside of the dome.

4. The cultivator of claim 1, wherein the light module comprises a plurality of vents for releasing the heat generated by the base portion of the lights into the atmosphere.

5. The cultivator of claim 1, wherein the light module comprises one or more fans for circulating ambient air within the light module to dissipate the heat generated by the base portion of the lights into the atmosphere.

6. The cultivator of claim 1, wherein the light module comprises a heat insulating layer provided onto a surface of the light module that contacts the dome for preventing an exchange of heat between an interior of the light module and the dome.

7. The cultivator of claim 1, wherein the one or more lights are LED lights having customizable light spectra.

8. The cultivator of claim 1, wherein the dome comprises one or more walls, and the light module defines an LED array and occupies a portion or an entirety of at least one of the walls.

9. The cultivator of claim 1, wherein the tray is adapted for receiving one or more of soil, water, crop seed and crop roots therein, the tray having an upper edge which is shaped and dimensioned to match with a lower edge of the dome for creating the enclosed environment.

10. The cultivator of claim 1, further comprising a sensor module for measuring one or more of temperature, humidity, light spectrum intensity, CO2, and soil moisture levels of the enclosed environment inside at least one of the dome or a vent in the dome, the vent configured to open or close for exchanging heat and humidity with the atmosphere.

11. The cultivator of claim 1, further comprising a control unit configured to receive a user input and customize a light spectrum of one or more of the lights in response to the user input.

12. The cultivator of claim 11, wherein the control unit is in operable communication with one or more electric fans to activate/deactivate the fans to ventilate the dome or an interior of the light module to dissipate the heat to the atmosphere.

13. A kit for building a cultivator, the kit comprising:
a tray;
a dome configured to join with the tray, the joined dome and the tray shaped and dimensioned to create an enclosed environment for growing crops therein;
a light module for installing onto the dome for projecting a light beam onto the crops, the light module comprising
one or more lights provided at given locations, each light having
a reflector portion through which a light beam is projected, the light reflector exhibiting low to no heat; and
a base portion including electric circuitry for producing electric current at desired voltage and intensity, the electric circuitry in the base portion producing heat during operation;
wherein the light module defines an enclosure enclosing at least the base portion of the one or more lights; and
wherein the dome comprises one or more cutouts therethrough positioned to match the locations of the lights on the light module; the light module being for installing on an exterior wall of the dome to allow the light reflectors to be in direct contact with the enclosed environment to un-obstructively project their light beams inside the dome through the cutouts, while keeping the base portion of the one or more lights within the light module for dissipating a heat generated by the base portion of the lights into the atmosphere away from the dome.

14. The kit of claim 13, wherein the tray is adapted for receiving one or more of soil, water, crop seed and crop roots therein, the tray having an upper edge which is shaped and dimensioned to match with a lower edge of the dome for creating the enclosed environment.

15. The kit of claim 13, further comprising a control unit configured to receive a user input and customize a light spectrum of one or more of the lights in response to the user input.

16. A cultivator for growing crops, comprising:
a tray;
a dome having a plurality of cutouts therethrough, the dome configured to join with the tray, the joined dome and the tray shaped and dimensioned to create an enclosed environment for growing crops therein;
a light module for projecting a light beam onto the crops, the light module comprising
one or more lights provided at given locations that match locations of the cutouts in the dome, each light module having a reflector portion through which a light beam is projected, the light reflector exhibiting low to no heat; and
a base portion including electric circuitry for producing electric current at desired voltage and intensity, the electric circuitry in the base portion producing heat during operation,
wherein the light module is installed on an exterior of the dome to allow the light reflectors to be in direct contact with the enclosed environment to un-obstructively project their light beams inside the dome through the cutouts, while keeping the base portion within the light module for dissipating a heat generated by the lights into the atmosphere away from the dome.

17. The cultivator of claim 16, wherein the light module comprises a plurality of vents for releasing the heat generated by the lights into the atmosphere.

18. The cultivator of claim 17, wherein the light module comprises one or more fans for circulating ambient air within the light module to dissipate the heat generated by the lights into the atmosphere.

19. The cultivator of claim 16, wherein the one or more lights are LED lights having customizable light spectra.

20. The cultivator of claim 16, wherein the dome comprises one or more walls, and the light module defines an LED array and occupies a portion or an entirety of at least one of the walls.

* * * * *